March 25, 1930.　　　　R. KNIESEL　　　　1,751,819
FILTER
Filed June 22, 1928
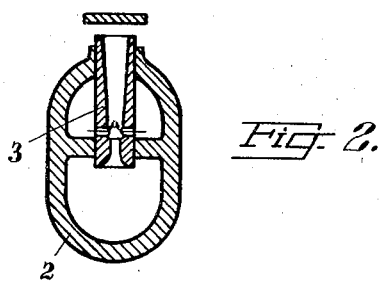
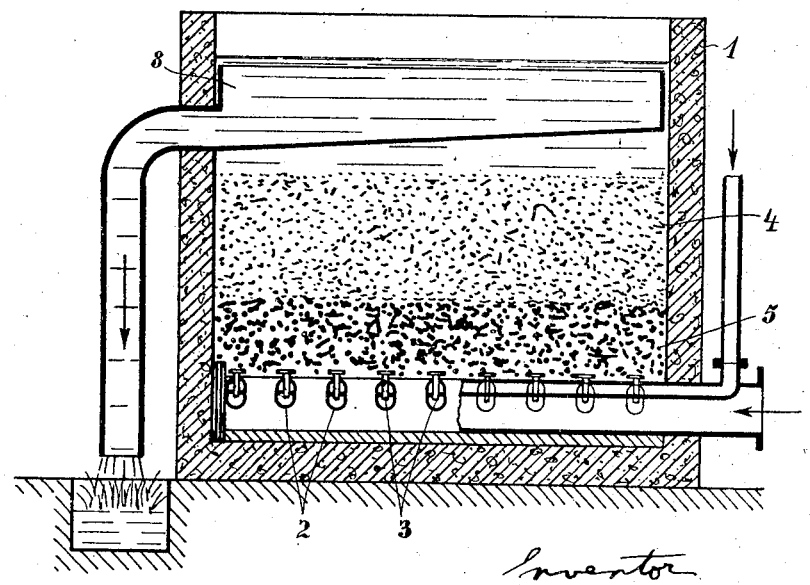

Patented Mar. 25, 1930

1,751,819

UNITED STATES PATENT OFFICE

RICHARD KNIESEL, OF BERLIN, GERMANY, ASSIGNOR TO BAMAG-MEGUIN A.-G., OF BERLIN, GERMANY, A CORPORATION OF GERMANY

FILTER

Application filed June 22, 1928, Serial No. 287,546, and in Germany February 20, 1928.

The invention relates to a device for flushing rapid filters, the pressure water needed for flushing the filter being employed as the medium for blowing-in air under pressure.

In comparison with the known devices of this kind, the invention is distinguished by the fact that each of the effluent orifices distributed uniformly over the entire bottom of the filter is designed as a water-operated air injector.

A typical embodiment of the invention is illustrated in the drawing, in which Fig. 1 is a cross section through a rapid filter, and Fig. 2 is a section through one of the injectors on a larger scale.

In the embodiment shewn, a distributing main system 2:6 provided with nozzle heads 3, is disposed in a concrete tank 1, a filtering medium 4, supported by a layer 5, being disposed above said main system. The distributing system consists of a main pipe 6 and branch pipes 2 both the main pipe and the branch pipes being divided into upper and lower compartments by a transverse partition 7. An air pipe 9 opens into the upper compartments. 8 denotes a gutter for admitting the raw water and carrying away the flushing water. The nozzle heads (Fig. 2) are each formed as a separate water-operated air injector, to which water is supplied through the lower compartments of the distributing pipes 2 and the main pipe 6, whilst they draw-in the required air from the upper compartment, for example through the feed pipe 9. Consequently, a large number of separate injectors come into operation, thus assuring absolutely uniform distribution of the air over the entire filtering surface.

I claim:—

1. A filter comprising, in combination, a container for filtering material, distributing pipes in said container having orifices each constituted as a water-jet suction injector for air for use in reverse flushing the filter, and a main connected with said pipes.

2. A filter comprising, in combination, a container for filtering material, distributing pipes in said container each divided to form two passages, a main connected with said pipes and also divided to form two passages for the supply of water and air respectively when flushing the filter, and a plurality of injector-like nozzles in said pipes communicating with both passages therein.

In testimony whereof I affix my signature.

RICHARD KNIESEL.